United States Patent
Li et al.

(10) Patent No.: US 11,111,446 B2
(45) Date of Patent: Sep. 7, 2021

(54) TEMPERATURE-CONTROLLING MEASURE FOR THE HYDROGENATION SLURRY BED REACTOR AND ITS DESIGN METHOD AND USE

(71) Applicant: CATECH TECHNOLOGY CO., LTD., Beijing (CN)

(72) Inventors: Suan Li, Beijing (CN); Qingyu Deng, Beijing (CN); Kunpeng Wang, Beijing (CN)

(73) Assignee: CATECH TECHNOLOGY CO., LTD., Beijing (CN)

( * ) Notice: Subject to any disclaimer, the term of this patent is extended or adjusted under 35 U.S.C. 154(b) by 461 days.

(21) Appl. No.: 15/777,338

(22) PCT Filed: Nov. 30, 2015

(86) PCT No.: PCT/CN2015/096023
§ 371 (c)(1),
(2) Date: May 18, 2018

(87) PCT Pub. No.: WO2017/084114
PCT Pub. Date: May 26, 2017

(65) Prior Publication Data
US 2019/0249092 A1   Aug. 15, 2019

(30) Foreign Application Priority Data
Nov. 18, 2015  (CN) .......................... 201510796589.5

(51) Int. Cl.
*C10G 47/36*   (2006.01)
*B01J 8/22*    (2006.01)
(Continued)

(52) U.S. Cl.
CPC ............... *C10G 47/36* (2013.01); *B01J 8/22* (2013.01); *C10G 1/08* (2013.01); *G05D 23/00* (2013.01); *G05D 23/12* (2013.01)

(58) Field of Classification Search
CPC ...... B01J 2208/00061; B01J 2208/0007; B01J 8/228; B01J 2208/00752; B01J 8/1809;
(Continued)

(56) References Cited

U.S. PATENT DOCUMENTS 4,249,908 A * 2/1981 Funk .......................... C07C 5/08
422/62
4,491,924 A * 1/1985 Agarwal .................. B01J 8/001
700/266
(Continued)

FOREIGN PATENT DOCUMENTS

| CN | 102029137 A | 4/2011 |
| CN | 203552089 U | 4/2014 |
| CN | 104888666 A | 9/2015 |

*Primary Examiner* — Shogo Sasaki

(57) ABSTRACT

A temperature-controlling measure for a hydrogenation slurry bed reactor has three control points that are set from low to high: cold hydrogen is injected automatically when the system reaches control point 1; cold oil in injected automatically when the system reaches control point 2; each pressure relief is opened automatically when the system reaches control point 3. The pressure relief point is set before and/or after the circulation pump of the reactor if internal circulation is set in the reactor; the pressure relief point is set at the reactor bottom if the internal circulation is not set; at least one pressure relief valve is set at each pressure relief point.

5 Claims, 1 Drawing Sheet

(51) Int. Cl.
*C10G 1/08* (2006.01)
*G05D 23/00* (2006.01)
*G05D 23/12* (2006.01)

(58) Field of Classification Search
CPC ............... B01J 8/22; B01J 2208/00637; B01J 2208/00716; B01J 8/226; C10G 47/36; C10G 1/08; G05D 23/1917; G05D 23/12; G05D 23/00
See application file for complete search history.

(56) References Cited

U.S. PATENT DOCUMENTS

| | | | | |
|---|---|---|---|---|
| 4,551,238 A * | 11/1985 | Marks | ................... | C10G 49/22 |
| | | | | 208/100 |
| 4,617,110 A * | 10/1986 | Hinojos | ................. | C10G 45/72 |
| | | | | 208/211 |
| 4,681,674 A * | 7/1987 | Graven | ................. | C10G 45/58 |
| | | | | 208/59 |
| 4,707,245 A * | 11/1987 | Baldasarri | .............. | C10G 49/26 |
| | | | | 208/143 |
| 5,000,924 A | 3/1991 | Cygnarowicz et al. | | |
| 8,314,276 B2 * | 11/2012 | Petri | ...................... | C10G 49/26 |
| | | | | 585/263 |
| 2010/0242349 A1 * | 9/2010 | Abe | ........................ | C10G 3/54 |
| | | | | 44/398 |
| 2011/0082324 A1 | 4/2011 | Wellenhofer et al. | | |

\* cited by examiner

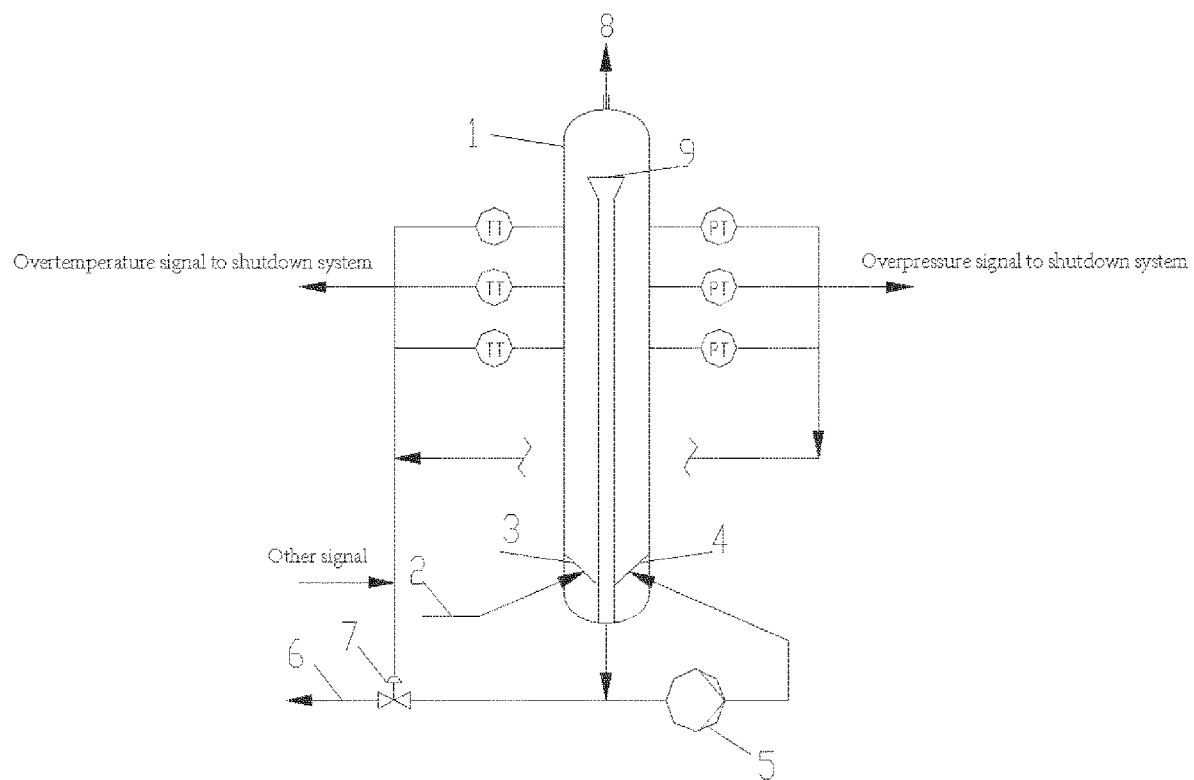

TEMPERATURE-CONTROLLING MEASURE FOR THE HYDROGENATION SLURRY BED REACTOR AND ITS DESIGN METHOD AND USE

FIELD OF THE INVENTION

The invention relates to a temperature-controlling measure for the hydrogenation slurry bed reactor, which can be employed for petrochemical industry and coal chemical industry.

BACKGROUND OF THE INVENTION

The hydrogenation slurry bed process can effectively utilize heavy oil resources and coal resources, and remove the impurities such as sulfur, nitrogen and heavy metals in the raw material, and improve the yield and quality of the light oil simultaneously. Furthermore, it could challenge the traditional refining technology, as its cost is relatively lower and the profit would be improved, so the slurry bed for the petrochemical industry has become a research hotspot in recent years. The hydrogenation slurry bed reactor is the core equipment of this process, which could determine the success of the operation for the whole plant.

The hydrogenation is a strong exothermic reaction, the increase of temperature in the reactor is high, and the hydrogenation slurry bed process is complex, which makes the possibility of overtemperature and overpressure of the reactor greatly increase. Therefore, it is necessary to make a prejudgment on the overtemperature and overpressure condition of the reactor and prevent those abnormal circumstances occurring by safety measures.

The feedstock is heated up in the heating furnace and then enters into the hydrogenation reactor. That the heating furnace is operated improperly, the feed of reactor is unstable, the outlet of the reactor is blocked, the internal circulation operation in the slurry bed reactor fails and so on can all lead to the overtemperature or overpressure. Once these circumstances occur, the temperature and pressure of the reactor may continue to rise, which will aggravate the cracking reaction of light oil, and it will not only reduce the yield of light oil, but also increase the pressure in the reactor sharply. In addition, the condensation reaction will occur which will result in the blockage of the devices. However, the existing technology does not take any prevention measures, which leads to the shutdown of reactor easily and causes great economic losses.

Currently, the measure to prevent the overtemperature and overpressure of the slurry bed reactor is to adopt the cold wall reactor which sets the lining inside the reactor. The inner lining has the heat insulation function, so the temperature of the metal wall in the reactor is not high so that the common steel can be used to save the capital cost. But the disadvantage of this measure is also obvious. Firstly, the service life of the lining is short under the high temperature and high pressure in the strong corrosion environment of the reactor, so it has to be replaced frequently. The reactor will explode if the dead lining is not replaced in time. Secondly, the manufacturing and construction of the inner lining is complicated and the risk is high as well. Therefore, the reactor without the inner lining is more practical, but it must control the operating temperature and pressure of the reactor within the normal range strictly. However, there is no appropriate control measure at present.

SUMMARY OF THE INVENTION

The invention provides the temperature-controlling measure for the hydrogenation slurry bed reactor and its design measure, and the operation risk is greatly reduced and the safety of the device is improved.

A temperature-controlling measure of a hydrogenation slurry bed reactor, comprises that:

three control points are set in turn from low to high: the cold hydrogen is injected automatically when the reaction system reaches the control point 1; the cold oil is injected automatically when the system reaches the control point 2; each pressure relief point is opened automatically when the system reaches the control point 3;

the control point 1 is: 425° C. $\leqslant$ T<440° C. and/or P $\geqslant$ 19 MPa; the control point 2 is: 440° C. $\leqslant$ T<455° C. and/or P $\geqslant$ 19 MPa; the control point 3 is: T $\geqslant$ 455° C. and/or P $\geqslant$ 20 MPa;

the pressure relief point is set before and/or after the circulation pump of the reactor if internal circulation is set in the reactor; the pressure relief point is set at the bottom of the reactor if the internal circulation is not set in the reactor; at least one pressure relief valve is set at each pressure relief point.

Preferably, the hydrogenation reactors are used in series, the number of series is 2-4, and the number of reactors with pressure relief points is more than 1.

Preferably, the pressure relief valve is controlled by the temperature or pressure in the reactor, the number of temperature measurement points is at least 1, the number of pressure measurement points is at least 1, a temperature self-control valve and/or hand control valve are set; the pressure relief valve opens when the reactor operates at more than 455° C. or the operating pressure is more than 20 MPa; an alarm triggers and the pressure relief valve opens when the system reaches either condition mentioned above alarm and start; all the control valve will open and the whole device will be shut down when the reactor temperature is more than 465 t and the operating pressure is more than 21.5 MPa.

Preferably, the overtemperature and overpressure signals are transmitted to DCS and/or SIS systems simultaneously, in order to initiate corresponding measures.

Preferably, the pressure relief valve also receives other pressure relief signal instructions.

Preferably, the signal instructions received are a signal of an abnormal pressure at the outlet of the feed pump of the reactor, the signal of abnormal pressure at the outlet of the circulating hydrogen compressor or the fresh hydrogen compressor, or the abnormal reaction in the reactor.

A hydrogenation slurry bed reactor adopts the temperature-controlling measure mentioned above.

The uses of the hydrogenation reactor comprise the process of hydrogenation of heavy oil, coal direct liquefaction, oil and coal mixing co-refining; the hydrogenation of heavy oil refers to the process refines one or combinations of the feedstocks including crude oil, atmospheric residue, vacuum residue, catalytic slurry, deoiled asphalt and coal tar; the oil and coal mixing co-refining process refers to the process which refines one or combinations of crude oil, atmospheric residue, vacuum residue, catalytic slurry, deoiled asphalt and coal tar, with one or combinations of lignite and bituminous coal; the proportion of crude oil to coal is from 30:70 up to 97:3.

The design method of the temperature-controlling measure for the hydrogenation slurry bed reactor, comprises that:

the measure is designed as follow: three control points are set in turn from low to high: the cold hydrogen is injected automatically when the system reaches the control point 1; the cold oil is injected automatically when the system reaches the control point 2; each pressure relief point is opened automatically when the system reaches the control point 3;

the control point 1 is: 425° C. ⩽ T<440° C. and/or P ⩾ 19 MPa; the control point 2 is: 440° C. ⩽ T<455° C. and/or P ⩾ 19 MPa; the control point 3 is: T ⩾ 455° C. and/or P ⩾ 20 MPa;

the pressure relief point is set before and/or after the circulation pump of the reactor if internal circulation is set in the reactor; the pressure relief point is set at the bottom of the reactor if internal circulation is not set in the reactor; at least one pressure relief valve is set at each pressure relief point.

For the temperature-controlling measure of this invention, appropriate control points are selected through a long term experiment and analysis. Temperature and pressure are controlled via three levels to deal with overtemperature and overpressure of the reactor. Cold hydrogen is injected or further cold oil is injected to stabilize the operating conditions. The next step would be carried out when the injection of cold hydrogen or cold oil cannot work which is judged depending on the temperature or pressure of the control points selected in this invention. Finally, the pressure relief valve at the bottom of the reactor is started to control the reaction temperature. The pressure relief valve can also play an urgent role in stopping work when the reactor is needed to be shut down. This invention could achieve a positive application effect in the hydrogenation slurry bed reactor. The measure is simple with high degree of automation, and it could also improve the safety of the reactor and production process.

FIGURE

FIG. 1 shows a scheme of the reactor according to present the invention.

DETAILED DESCRIPTION OF THE INVENTION

In order to explain the invention better, the combination of FIG. 1 and an embodiment will be illustrated below.

Embodiment

This embodiment introduces a slurry bed hydrogenation reactor in one stage of the coal and oil mixing co-refining process. The pressure relief point is set at the inlet of the circulating pump, the amount of the pressure relief valve 7 is one, the depressurizing line 6 is the pipeline of the pressure relief valve 7, which is used to discharge the released medium.

The feedstock 2 enters the reactor 1 through the feeding outlet of the feed distributor 3, in addition, there is an internal circulation system, which includes the circulating feed distributor 4, the circulation pump 5 and the inlet of internal circulation 9 in the reactor.

The operating temperature of the outlet is not more than 455° C. during the normal operation of the reactor 1. As the hydrocracking reaction is exothermic, the temperature measurement point is set at the closest point from the outlet of the reactor 8 to detect the maximum operating temperature of the reactor. In order to avoid the failure measurement of the thermometer or sensor, three thermometers are set up by taking temperature readings from two of the three thermometers. The cold hydrogen is injected automatically when 425° C. is reached; the cold oil is injected automatically when 440° C. is reached; when 455° C. is reached, the alarm is triggered and the pressure relief valve 7 is started to open with transferring the signal to the DCS and SIS system. The pressure relief valve 7 is fully opened automatically when the operating temperature exceeds 465° C. and the device shuts down.

The operating pressure at the inlet is not more than 18.5 MPa when the reactor 1 is operated normally. As the flow direction is from bottom to top, the pressure point is set at the closest point of the inlet of the reactor, i.e. the feeding outlet of the feed distributor 3, to detect the maximum operating pressure of the reactor. In order to avoid the failure measurement of the pressure gauge or sensor, three pressure gauges are set up by taking readings from two of the three thermometers. The pressure relief valve is started to open (controlling the temperature by controlling the pressure) when the operation pressure exceeds 20 MPa, and the signal is transferred to the DCS and SIS system. The pressure relief valve is fully opened and the device shuts down when the pressure exceeds 21.5 MPa. The pressure relief valve also accepts other signals outside the reaction system that need to start the depressurizing, such as the signal of an abnormal pressure at the outlet of the feed pump of the reactor, the signal of an abnormal pressure at the outlet of the circulating hydrogen compressor or the fresh hydrogen compressor, or the abnormal reaction in the reactor.

This embodiment achieves a positive application effect in the hydrogenation slurry bed reactor through the practical verification in production. The measure designed is simple with high degree of automation, and it could also improve the safety of the reactor and production process and ensure the reactor has no safety issue for long term.

The embodiment above is only an optimal specific embodiment of this invention, but the scope of the invention is not limited to it. Any changes which can be easily considered or replaced in the disclosure scope of the invention by a person skilled in this art, should be covered within the protection scope of the invention. As a result, the protection scope of the present invention shall be based on the protection scope of the claims.

We claim:

1. A temperature-controlling method employed in a hydrogenation slurry bed reactor system, comprising:
   setting three control points in turn from low to high:
   automatically injecting cold hydrogen in response to determining that the reactor system reaches control point 1;
   automatically injecting cold oil in response to determining that the reactor system reaches control point 2; wherein each pressure relief point is opened automatically in response to determining that the reactor system reaches control point 3;
   wherein the control point 1 is: 425° C. ⩽ T<440° C. and/or P ⩾ 19 MPa; the control point 2 is: 440° C. ⩽ T<455° C. and/or P ⩾ 19 MPa; the control point 3 is: T ⩾ 455° C. and/or P ⩾ 20 MPa;
   setting the pressure relief point before and/or after a circulation pump of the reactor in response to determining that internal circulation is set in the reactor system; and
   setting the pressure relief point at the bottom of the reactor system in response to determining that the internal circulation is not set in the reactor system, at least one pressure relief valve being set at each pressure relief point;
   wherein the at least one pressure relief valve is controlled by a temperature or pressure in the reactor system, a number of temperature measurement points being at least 1, a number of pressure measurement points being at least 1 and further comprising: setting a temperature self-control valve and/or hand control valve, the pressure relief valve opening and an alarm being triggered in response to determining that the reactor system operates at more than 455° C. or an operating pressure is more than 20 MPa; and opening all control valves and shutting down the reactor system in response to determining that the reactor system temperature is more than 465° C. and the operating pressure is more than 21.5 MPa.

2. The temperature-controlling method according to claim 1, wherein a number of hydrogenation reactors are used in series, the number of being 2-4, and the number of hydrogenation reactors with pressure relief points being more than 1.

3. The temperature-controlling method according to claim 1, wherein overtemperature and overpressure signals are transmitted to DCS and/or SIS systems simultaneously, in order to initiate corresponding measures.

4. The temperature-controlling method according to claim 1, wherein the at least one pressure relief valve also other pressure relief signal instructions.

5. The temperature-controlling method according to claim 1, wherein receipt of signal instructions are a signal of an abnormal pressure at a feed pump outlet of the reactor system, a signal of abnormal pressure at an outlet of a circulating hydrogen compressor or a fresh hydrogen compressor, or an abnormal reaction in the reactor system.

* * * * *